United States Patent

Amano et al.

[11] Patent Number: 5,287,093
[45] Date of Patent: Feb. 15, 1994

[54] IMAGE PROCESSOR FOR PRODUCING CROSS-FADED IMAGE FROM FIRST AND SECOND IMAGE DATA

[75] Inventors: Yoshinori Amano, Takatsuki; Misao Kato, Katano; Yoshio Hirauchi, Osaka; Mari Kimura, Kishiwada, all of Japan

[73] Assignee: Matsushita Electric Industrial Co., Ltd., Osaka, Japan

[21] Appl. No.: 712,039

[22] Filed: Jun. 7, 1991

[30] Foreign Application Priority Data

Jun. 11, 1990 [JP] Japan ................................ 2-151935

[51] Int. Cl.$^5$ .................................................. G09G 1/06
[52] U.S. Cl. .................................. 345/139; 358/183; 358/22
[58] Field of Search ............... 340/729, 723, 799, 798, 340/703; 358/182, 183, 22

[56] References Cited

U.S. PATENT DOCUMENTS

| | | | |
|---|---|---|---|
| 4,360,831 | 11/1982 | Kellar | 358/182 |
| 4,675,725 | 6/1987 | Parkyn | 358/183 |
| 4,951,144 | 8/1990 | Des Jardins | 358/183 |
| 4,970,595 | 11/1990 | Bloomfield | 358/183 |
| 5,032,917 | 7/1991 | Aschwanden | 358/22 |

FOREIGN PATENT DOCUMENTS 1-293078 11/1989 Japan.

*Primary Examiner*—Ulysses Weldon
*Assistant Examiner*—Doon Yue Chow
*Attorney, Agent, or Firm*—Wenderoth, Lind & Ponack

[57] ABSTRACT

An image processor produces a cross-faded image from first and second image data and first and second control data. The cross-faded image corresponds to a product of the first image data and the first control data and a product of the second image data and the second control data. The image processor includes a first address generator which generates a first l-bit address signal made up of the upper $(n-k_1)$ bits of the first n-bit image data and the upper $(m-k_2)$ bits of the first m-bit control data. Similarly, a second address generator is provided which generates a second l-bit address signal made up of the upper $(n-k_1)$ bits of the second n-bit image data and the upper $(m-k_2)$ bits of the second m-bit control data. The number of bits l of each address signal is less than a sum of the bits n and m of each of the image data and control data. The first and second address signals are used to access a ROM which is used to generate corresponding first and second product data. The product data is summed to generate cross-faded image data.

7 Claims, 2 Drawing Sheets

IMAGE PROCESSOR FOR PRODUCING CROSS-FADED IMAGE FROM FIRST AND SECOND IMAGE DATA

BACKGROUND OF THE INVENTION

1. Field of the Invention

The present invention relates to an image processor for producing a special effect, particularly cross fade, during the visual display of image data.

2. Description of the Prior Art

One special effect known as "dissolve (cross fade)" is commonly used in the display of still images, for example, on a monitor screen. This special effect exhibits, rather than an immediate shift from one picture to another, a so-called cross fading in which the current image is faded out while a subsequent image is faded in. If the data of the current image is denoted A, the data of the subsequent image is denoted B, and a control signal is denoted $\alpha$, the "dissolve" effect is expressed as:

$$C + A \cdot \alpha + B \cdot (1-\alpha)$$

where the effect is realized by gradually varying $\alpha$ from 1 to 0. This visual effect becomes feasible using hardware such as a multiplier or a ROM having a lookup table. With respect to circuitry simplicity and high-speed operation, the use of a ROM is more advantageous. A technique using the ROM will now be described.

The image data of the current and subsequent images and the control signal $\alpha$ are fed to the ROM and together serve as an address signal of the ROM. Then, the ROM produces two resultant outputs denoting the products $A \cdot \alpha$ and $B \cdot (1-\alpha)$ corresponding to previously stored data. $A \cdot \alpha$ and $B \cdot (1-\alpha)$ are then summed to obtain intermediate image data C denoting a cross faded image.

If each original image data A and B consists of an 8-bit word and the control signal $\alpha$ consists of a 5-bit word, the ROM must accept a 13-bit address signal and thus, must at least have a memory capacity of 8 Kbits. Since the control signal $\alpha$ contains 5-bits, the intermediate image data C is produced in the form of 32 gradations; 31/31, 30/31, ..., 1/31, and 0/31, corresponding to the variation of $\alpha$ from 1 to 0. If each of the resultant intermediate image data C is displayed for 1/30 second, the total duration of the display shift from the current image A to the subsequent image B as $\alpha$ varies from 1 to 0 takes a period of 1/30×31 second or about one second. The longer the display shift duration, the more noticeable the shift from the image data A to the image data B will be. However, if the duration of the display shift is increased by extending the display time of each intermediate image, the "dissolve" effect will appear jerky (not smooth). For increasing the duration of the "dissolve" effect and at the same time exhibiting a smooth visual effect, it is necessary to increase the number of bits of the control signal $\alpha$. However, this would require that the memory capacity of the ROM in a prior art image processor also be increased. Also, if the case where a multiplier is employed, the number of bits of a multiplication coefficient would have to be increased and thus, an arithmetic operation at a higher speed would be necessary.

SUMMARY OF THE INVENTION

It is an object of the present invention to provide an image processor capable of producing a smooth display image shift by increasing the duration of the "dissolve" effect with requiring an increased memory capacity of a ROM.

For achievement of the above object, an improved image processor according to the present invention is characterized by the following relations:

$$l = (n - k_1) + (m - k_2) \text{ and}$$

$$k = k_1 + k_2 (0 \leq k_1 \leq k, \ 0 \leq k_2 \leq k)$$

where l denotes the number of bits of an address signal applied to a ROM, m denotes the number of bits of a control signal $\alpha$, n denotes the number of bits of an image data, and $k_1$ and $k_2$ are values determined by the value of $\alpha$. The lower k bits of either the image data or the control signal are selected on a bit-by-bit basis according to the value of the control signal $\alpha$ and then fed to the ROM. Accordingly, the apparent number of bits of the control signal $\alpha$ can be increased from (m−k) to m so that the duration of display shift is extended. As the result, a smooth shift of one image to another on a display screen (the "dissolve" effect) will be ensured.

DESCRIPTION OF THE PREFERRED EMBODIMENTS

Figure 1:
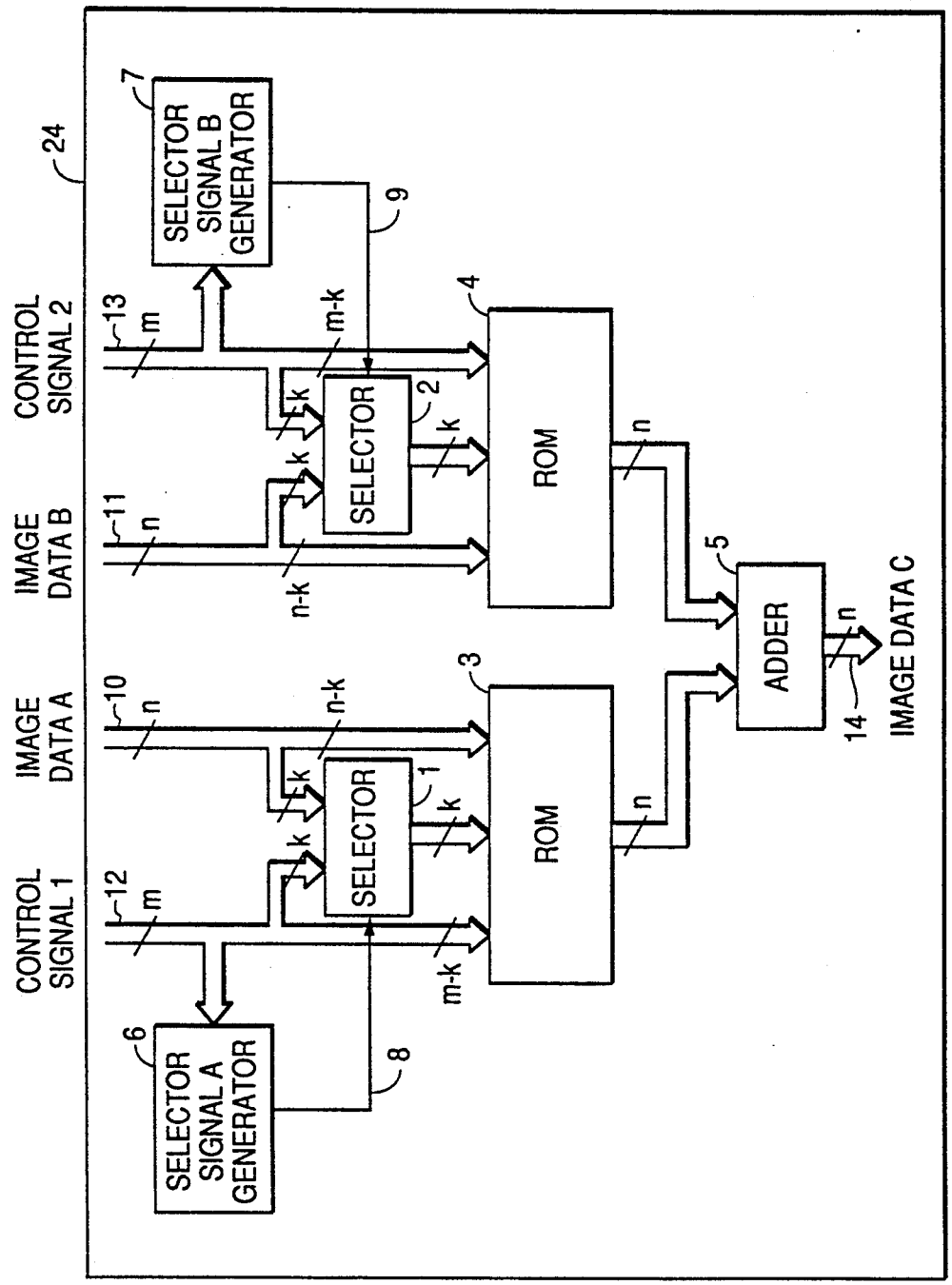
FIG. 1 is a block diagram of an image processing calculator provided in an image processor according to the present invention.

In the display of a series of image data on a monitor screen, a "dissolve (cross fade)" technique entails gradually shifting from one image to another. More particularly, the technique allows a current image to be faded out and a subsequent image to be simultaneously faded in. If the data of the current image is denoted A and the data of the following image is denoted B, this effect is expressed as:

$$C = A \cdot \alpha_1 + B \cdot \alpha_2 (0 \leq \alpha 1 \leq 1, 0 \leq \alpha 2 \leq 1) \quad (1)$$

The data of a transit cross faded image denoted by C varies as the control signal $\alpha_1$ is shifted from 1 to 0 and simultaneously, the control signal $\alpha_2$ is shifted from 0 to 1. FIG. 1 illustrates an image processing calculator 24 provided in an image processor of the present invention for carrying out the above arithmetic operation.

Each image data A and B is received in an n-bit digital form and each control signal $\alpha_1$ and $\alpha_2$ is represented by an m-bit binary number. As shown, ROMs 3 and 4 are read-only memories each for receiving an l-bit address signal and generating an n-bit output. The relationship between l, m, and n is expressed as:

$$n + m > l \quad (2)$$

Referring first to the image data A, a selector signal A generator 6 is arranged for decoding the value of the control signal $\alpha_1$ and generating a corresponding selector signal 8. The selector signal 8 in turn actuates a selector 1 to extract the lower k bits from each of the image data A and the control signal $\alpha_1$ for transmission. The number of bits k is obtained from:

$$k = n + m - l \qquad (3)$$

It is assumed that the lower k bits of the image data a is expressed as $a_{k-1}, a_{k-2}, \ldots, a_1$, and $a_0$ and the same of the control signal $\alpha_1$ is expressed as $c_{k-1}, c_{k-2}, \ldots, c_1$, and $c_0$. In operation, the selector 1 chooses one of the pairs; $a_{k-1}$ and $c_0$, $a_{k-2}$ and $c_1, \ldots$, $a_1$ and $c_{k-2}$, or $a_0$ and $c_{k-1}$. As the result, the selector 1 outputs the upper $k_2$ bits of the lower k bits of the image data A and the upper $k_1$ bits of the lower k bits of the control signal $\alpha_1$. The numerals $k_1$ and $k_2$ are determined by:

$$l = (n - k_1) + (m - k_2) \quad (0 \leq k_1 \leq k, 0 \leq k_2 \leq k) \qquad (4)$$

Then, the upper $(n - k_1)$ bits of the image data A and the upper $(m - k_2)$ bits of the control signal $\alpha_1$ are fed to the ROM 3 as an address signal in order to access prestored product data. The resultant n-bit product data is transferred to one of two inputs of the adder 5.

As shown in FIG. 1, a selector 2 and a ROM 4, similar to the selector 1 and the ROM 3, are provided for the image data B. A selector signal B generator 7 is also provided for decoding the value of a control signal $\alpha_2$ to the extraction selector signal 9. The selector signal 9 triggers the extraction of the lower k bits of each of the image data B and control signal $\alpha_2$ signal. Then, after the selector 2 carries out a bit selection like that of the selector 1 described above, the upper $(n - k_1)$ bits of the image data B and the upper $(m - l_2)$ bits of the control signal $\alpha_2$ are applied to the ROM 4 as an address signal to access product data which is then transferred to the other input of the adder 5. Finally, the two resultant product data are summed by the adder 5 to produce the image data C.

An example of the foregoing operation will now be described assuming that n=8, m=7, and k=2. The numerals $k_1$ and $k_2$ are determined according to the contents of the control signal $\alpha$, as shown in Table 1. Table 1 depicts a binary representation ($c_7, c_6, c_5, \ldots, c_2, c_1$, and $c_0$) and a decimal representation of the control signal $\alpha$.

TABLE 1

| Binary form of Control signal C6C5C4C3C2C1C0 | Decimal form of Control signal | Values of k1 and k2 |
|---|---|---|
| 0000000 | 0 | k1 = 2 |
| 0000001 | 1 | k2 = 0 |
| 0000010 | 2 | |
| . | . | |
| . | . | |
| 1111011 | 123 | |
| 1111100 | 124 | k1 = 0 |
| 1111101 | 125 | k2 = 2 |
| 1111110 | 126 | |
| 1111111 | 127 | |

When decimal representation of the control signal ranges from 0 to 123, $k_1=2$ and $k_2=0$. When the control signal ranges from 124 to 127, $k_1=0$ and $k_1=2$. The selector signal A generator 6 and the selector signal B generator 7 may be formed of ROMs having a 7-bit input and 1-bit input. Also, they may instead be formed of logic circuits for detecting when the upper 5 bits ($c_6$, $c_5$, $c_4$, $c_3$, and $c_2$) of the control signal are "1"s. The selector signal 8 from the selector signal A generator 6 actuates the selector 1 to transmit the lower 2 bits of the control signal $\alpha_1$ when the control signal $\alpha_1$ is 124 to 127. Also, the same selecting action of the selector 2 is triggered by the selector signal 9 according to the control signal $\alpha_2$.

Table 2 shows the decimal representation and the corresponding multiplication coefficient $\alpha'$ of the control signal $\alpha$.

TABLE 2

| Decimal form of Control signal | Multiplication coefficient $\alpha'$ |
|---|---|
| 0 | 0/124 |
| 1 | 1/124 |
| 2 | 2/124 |
| . | . |
| . | . |
| 123 | 123/124 |
| 124 | 124/124 |
| 125 | |
| 126 | |
| 127 | |

As shown in Table 1, the lower 2 bits of the control signal $\alpha$ is not fed to the ROM when the value of the control signal $\alpha$ is 124 to 127. Hence, the number of gradations during the change of the multiplication coefficient $\alpha'$ from 0 to 1 or 1 to 0 becomes 125. Accordingly, the denominator of the multiplication coefficient $\alpha'$ is equal to 124. When the value of the control signal $\alpha$ is 0 to 123, the image data less the lower 2 bits thereof is multiplied by the multiplication coefficient $\alpha'$. When the value of the control signal $\alpha$ is 124 to 127, the 8-bit value of the image data is effectively multiplied by 124/124. The resultant product data is output from each of the ROMs 3 and 4 where relevant data are previously stored representative of the foregoing multiplying operations.

In operation, the shift from the image data A to the image data B on the screen of a display monitor is gradually executed by decreasing the decimal value of the control signal $\alpha_1$ from 127 to 126, ..., 2, 1, and 0 and at the same time, increasing the decimal value of the control signal $\alpha_2$ from 0 to 1, 2, ..., to 127, to produce a series of the intermediate image data C which are displayed in sequence on the screen of the display monitor. For a shift from the image data B to the image data A, a reverse processing of the two control signals $\alpha_1$ and $\alpha_2$ is carried out.

Figure 2:
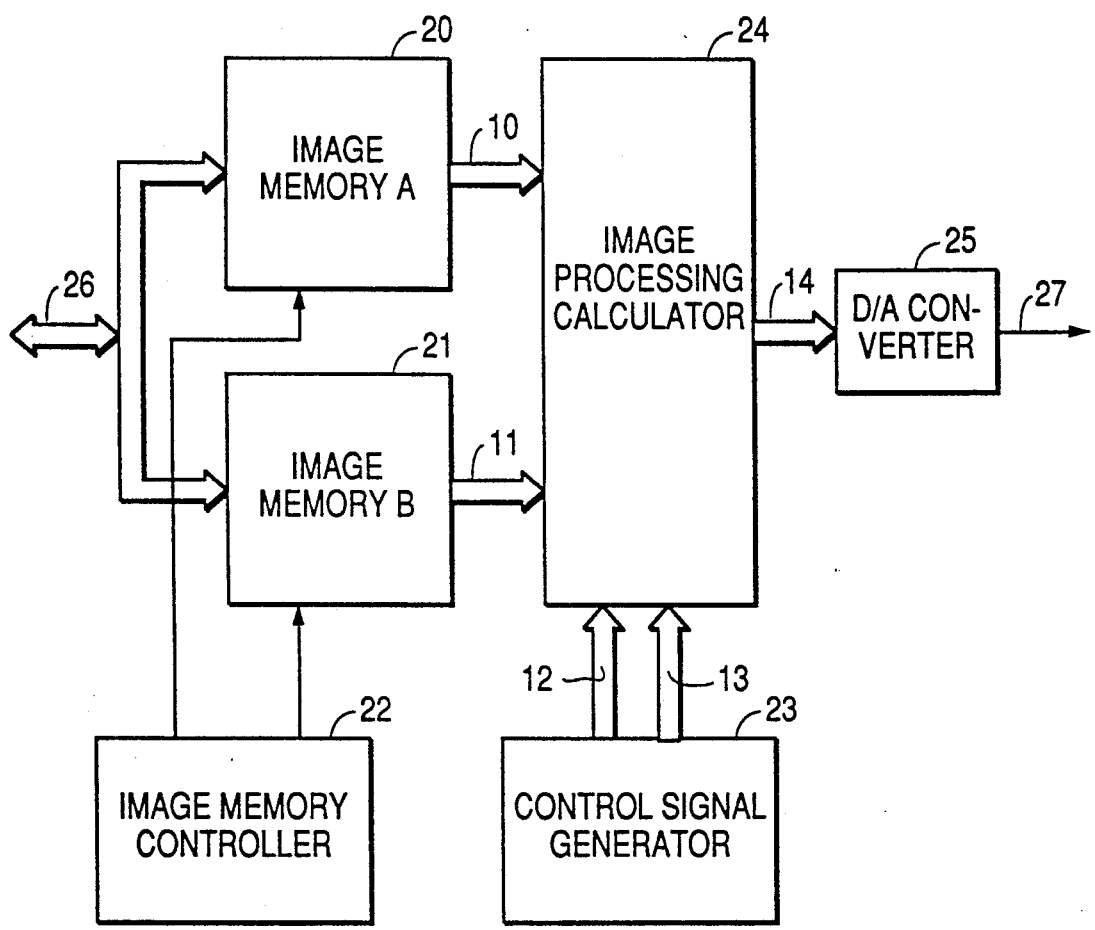
FIG. 2 is a block diagram of the image processor showing one embodiment of the present invention.

FIG. 2 is a block diagram of the image processor of the present invention. In operation, image data from an interface 26 are stored into an image memory A 20 and an image memory B 21 by the operation of an image memory controller 22. The image processing calculator 24 is arranged as illustrated in FIG. 1. The image data 10 (image data A) and 11 (image data B) are read out of the image memory A 20 and image memory B 21, respectively, under control of the image memory controller 22. The image processing calculator 24 subjects the read-out image data 10 and 11 to the above-described processing according to control signals $\alpha_1$ and $\alpha_2$, denoted by reference numerals 12 and 13, generated by a control signal generator 23 to produce the image data C denoted by reference numeral 14. The image data C 14 is transmttted to a D/A converter 25 where it is converted into an analog output signal 27 which is in turn fed to a display monitor.

Although the shift of the image data A to the image data B in the embodiment is carried out by decreasing the control signal $\alpha_1$ from 1 to 0 and simultaneously, increasing the control signal $\alpha_2$ from 0 to 1, the same effects can be achieved by varying the two control signals $\alpha_1$ and $\alpha_2$ from 0 to 1. In this case, however, the generation of a selector signal 9 in the selector signal B generator 7 and the data stored in the rom 4 are different from those in the foregoing embodiment. The corresponding operation will be described assuming that n=8, m=7, and k=2. The generation of a selector signal 8 at the selector signal A generator 6 and the data stored in the ROM 3 are in accordance with the lists shown in Tales 1 and 2. The generation of the selector signal 9 in the selector signal B generator 7 and the data stored in the ROM 4 comply with Tables 3 and 4.

TABLE 3

| Binary form of Control signal C6C5C4C3C2C1C0 | Decimal form of Control signal | Values of k1 and k2 |
|---|---|---|
| 0000000 | 0 | k1 = 0 |
| 0000001 | 1 | k2 = 2 |
| 0000010 | 2 | |
| 0000011 | 3 | |
| 0000100 | 4 | |
| . | . | |
| . | . | |
| . | . | |
| 1111101 | 125 | k1 = 2 |
| 1111110 | 126 | k2 = 0 |
| 1111111 | 127 | |

TABLE 4

| Decimal form of Control signal | Multiplication coefficient $\alpha'$ |
|---|---|
| 0 | 124/124 |
| 1 | |
| 2 | |
| 3 | |
| 4 | 123/124 |
| . | . |
| . | . |
| 126 | 1/124 |
| 127 | 0/124 |

As shown in Table 3, the selector signal B generator 7 produces a selector signal 9 upon detecting that the upper 5 bits $c_6$, $c_5$, $c_4$, $c_3$, and $c_2$) of the control signal o: in binary form are "0"s. Also, as shown in Table 4, the ROM 4 is arranged for holding data so that when the decimal value of the control signal $\alpha_2$ is 0 to 3, the multiplication coefficient $\alpha'$ is 124/124. Accordingly, the values of $k_1$, $k_2$, and $\alpha'$ in Tables 3 and 4 are equal to those in Tables 1 and 2 when the bits of the control signal are all inverted.

The effects of the present invention are equally established when l, m, n, and k are other arbitrary numbers.

Also, as a specific case of the embodiment, the relation between the two control signal $\alpha_1$ and $\alpha_2$ may be expressed as:

$$\alpha_2 = 1 - \alpha_1 \qquad (5)$$

What is claimed is:

1. An image process for generating third image data C from first n-bit image data A, second n-bit image data B, first m-bit control data $\alpha_1$ and second m-bit control data $\alpha_2$, wherein m and n are positive integers, comprising:

a first address generator for generating a first l-bit address signal made up of the upper $(n-k_{11})$ bits of the first n-bit image data A and the upper $(m-k_{12})$ bits of the first m-bit control data $\alpha_1$, wherein l is a positive integer, wherein $k_{11}$ and $k_{12}$ are each integers having a value of at least zero, wherein $l < (m+n)$, wherein $l = \{(n-k_{11}) + (m-k_{12})\}$, and wherein $k = k_{11} + k_{12}$ $(0 \leq k_{11} \leq k, 0 \leq k_{12} \leq k)$;

a second address generator for generating a second l-bit address signal made up of the upper $(n-k_{21})$ bits of the second n-bit image data B and the upper $(m-k_{22})$ bits of the second m-bit control data $\alpha_2$, wherein $k_{21}$ and $k_{22}$ are each integers having a value of at least zero, wherein $l = \{(n-k_{21}) + (m-k_{22})\}$, and wherein $k = k_{21} + k_{22}(0 \leq k_{21} \leq k, 0 \leq k_{22} \leq k)$;

a read-only-memory having a look-up table for generating first product data $(A \cdot \alpha_1)$ and second product data $(B \cdot \alpha_2)$ in accordance with said first l-bit address data and said second l-bit address data applied thereto, respectively;

means for summing said first product data $(A \cdot \alpha_1)$ and said second product data $(B \cdot \alpha_2)$ to obtain the third image data C.

2. An image processor as recited in claim 1, wherein $\alpha_2 = 1 - \alpha_1$.

3. An image processor as recited in claim 1, wherein said first address generator includes first selector means for setting a value of $k_{11}$ and a value of $k_{12}$ according to a value of the first control signal $\alpha_1$.

4. An image processor as recited in claim 3, wherein said first selector means includes means for selecting the upper $k_{12}$ bits of the lower k bits of the first n-bit image data A and the upper $k_{11}$ bits of the lower k bits of the first m-bit control data $\alpha_1$ to be included in the first l-bit address signal.

5. An image processor as recited in claim 4, wherein said second address generator includes second selector means for setting a value of $k_{21}$ and a value of $k_{22}$ according to a value of the second control signal $\alpha_2$.

6. An image processor as recited in claim 5, wherein said second selector means includes means for selecting the upper $k_{22}$ bits of the lower k bits of the second n-bit image data B and the upper $k_{21}$ bits of the lower k bits of the second m-bit control data $\alpha_2$ to be included in the second l-bit address signal.

7. An image processor as recited in claim 6, wherein $\alpha_2 = 1 - \alpha_1$.

* * * * *